No. 873,871. PATENTED DEC. 17, 1907.
A. KÖNIG.
RAMSDEN OCULAR.
APPLICATION FILED MAY 25, 1907.
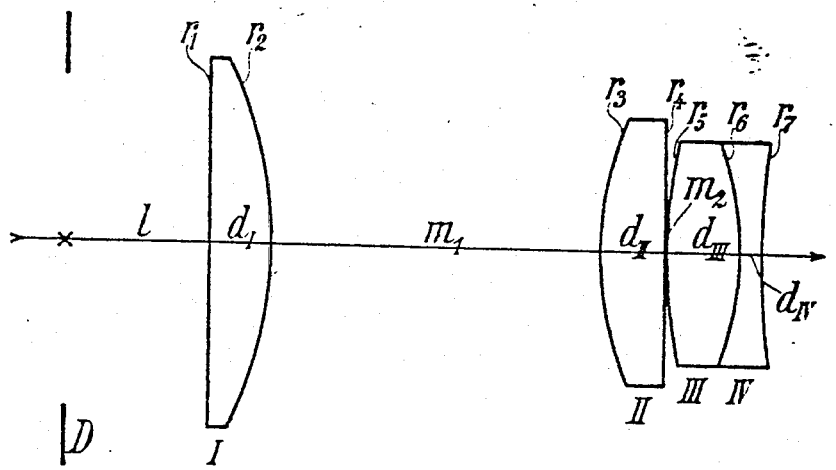

UNITED STATES PATENT OFFICE.

ALBERT KÖNIG, OF JENA, GERMANY, ASSIGNOR TO THE FIRM OF CARL ZEISS, OF JENA, GERMANY.

RAMSDEN OCULAR.

No. 873,871.     Specification of Letters Patent.     Patented Dec. 17, 1907

Application filed May 25, 1907. Serial No. 375,606.

*To all whom it may concern:*

Be it known that I, ALBERT KÖNIG, doctor of philosophy, a citizen of the German Empire, and residing at Carl Zeiss strasse, Jena, in the Grand Duchy of Saxe-Weimar, Germany, have invented a new and useful Ramsden Ocular, of which the following is a specification.

The invention consists in an improved Ramsden ocular. In the specification 775,353 a three lens system consisting of a double lens and a separate collective lens has been shown by Figure 2 and described as an eye-lens system for Ramsden oculars, which reproduces the virtual image projected by the field-lens without considerable chromatic and astigmatic aberrations or distortion. Thus in the Ramsden ocular constructed with this eye-lens system sharpness of the image has been combined with the merits of the Kellner ocular. But this success is accompanied by the drawback, that there are two highly curved surfaces to be made, viz., those cemented together. It will be seen from the data given with reference to Fig. 2 in the specification cited, that in that example the radius of these surfaces amounts to little more than a third of the focal length of the eye-lens system. According to the present invention a considerably smaller curvature of the two cemented surfaces is achieved by the following modification. In the eye-lens system according to specification 775,353, Fig. 2, the cemented correcting lens precedes the simple lens, on which the "collective effect" of the system depends, in this way, that it turns the convex side of its cemented surface to the simple lens. This direction of curvature must be reversed, a suitable choice of the kinds of glass for the double lens being supposed. By doing so the curvature of the cemented surface is lessened, no matter whether the total effect of the double lens be collective or dispersive, if it be only relatively weak, that is at most only half so powerful as the collective effect of the simple lens. Investigation has further revealed, that the lessening of the curvature of the cemented surface is greatest, if the order of the two lenses be reversed, that is, if the collective simple lens—to which, according to the present invention, the double lens has to turn the concave side of its cemented surface—be the front lens.

A constructional example is represented in the annexed drawing. The field lens is a simple one. In the eye-lens system the simple collective lens precedes the double lens. The radii, thicknesses and distances for the lenses employed in this example are here tabulated and have reference to an ocular having a focal length 100. The kinds of glass are characterized by the refractive indices $n_c$ and $n_F$ appertaining to the lines C and F of the solar spectrum.

| Radii. | Thicknesses and Distances. |
|---|---|
| $r_1 = \infty$ | $l = 34.8$ |
| $r_2 = 100$ | $d_1 = 15.0$ |
| $r_3 = 80.3$ | $m_1 = 80$ |
| $r_4 = \infty$ | $d_{II} = 15.5$ |
| $r_5 = 125$ | $m_2 = 0$ |
| $r_6 = 76$ | $d_{III} = 17.5$ |
| $r_7 = 200$ | $d_{IV} = 5.0$ |

Kinds of Glass.

| | I, III | II | IV |
|---|---|---|---|
| $n_c =$ | 1.50762 | 1.58703 | 1.60814 |
| $n_F =$ | 1.51559 | 1.59673 | 1.62474 |

I claim:

1. A Ramsden ocular, the eye-lens system of which is composed of a simple collective lens and a double lens, the components of the double lens being cemented together with curved surfaces concave towards the simple lens and the absolute value of the power of the double lens being less than half that of the power of the simple lens.

2. In a Ramsden ocular the combination with a field-lens of an eye-lens system composed of a simple collective lens located next to the field-lens and a double lens, the components of which are cemented together with curved surfaces concave towards the field-lens and the absolute value of the power of which is less than half that of the power of the simple lens.

ALBERT KÖNIG.

Witnesses:
PAUL KRÜGER,
FRITZ SANDER.